(12) United States Patent
Chang

(10) Patent No.: US 8,953,016 B2
(45) Date of Patent: Feb. 10, 2015

(54) APPARATUS AND METHOD FOR GENERATING POLARIZED VIDEO STREAM ACCORDING TO MULTI-VIEW VIDEO STREAM AND MOTION INFORMATION DERIVED FROM MULTI-VIEW VIDEO STREAM

(75) Inventor: Te-Hao Chang, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 307 days.

(21) Appl. No.: 13/223,320

(22) Filed: Sep. 1, 2011

(65) Prior Publication Data

US 2013/0057645 A1 Mar. 7, 2013

(51) Int. Cl.
*H04N 13/00* (2006.01)
*G02B 27/26* (2006.01)

(52) U.S. Cl.
CPC ............ *H04N 13/0029* (2013.01); *G02B 27/26* (2013.01); *H04N 2013/0085* (2013.01)
USPC .................................... 348/43; 348/E13.068

(58) Field of Classification Search
None
See application file for complete search history.

(56) References Cited

U.S. PATENT DOCUMENTS

| 2008/0055477 A1* | 3/2008 | Wu et al. ........................ 348/620 |
| 2011/0254929 A1* | 10/2011 | Yang et al. ...................... 348/51 |
| 2012/0013711 A1* | 1/2012 | Tamir et al. ..................... 348/46 |

\* cited by examiner

*Primary Examiner* — Christopher S Kelley
*Assistant Examiner* — Kaitlin A Retallick
(74) *Attorney, Agent, or Firm* — Winston Hsu; Scott Margo

(57) ABSTRACT

A video processing apparatus is used for generating a polarized video stream according to a multi-view video stream, and includes a motion information detector and a polarization converter. The motion information detector is arranged for detecting motion information of the multi-view video stream by processing the multi-view video stream. The polarization converter is coupled to the motion information detector, and arranged for converting the multi-view video stream into the polarized video stream according to the motion information.

30 Claims, 9 Drawing Sheets

APPARATUS AND METHOD FOR GENERATING POLARIZED VIDEO STREAM ACCORDING TO MULTI-VIEW VIDEO STREAM AND MOTION INFORMATION DERIVED FROM MULTI-VIEW VIDEO STREAM

BACKGROUND

The disclosed embodiments of the present invention relate to converting a multi-view video stream into a polarized video stream, and more particularly, to an apparatus and method for generating a polarized video stream according to a multi-view video stream (e.g., a stereo/three-dimensional video stream carrying left-eye images and right-eye images) and motion information derived from the multi-view video stream.

With the development of science and technology, users are pursing stereoscopic and more real image displays rather than high quality images. There are two techniques of present stereo video display. One is to use a video output apparatus which collaborates with glasses (such as anaglyph glasses, polarization glasses or shutter glasses), while the other is to directly use a video output apparatus without any accompanying glasses. No matter which technique is utilized, the main theory of stereo video display is to make the left eye and the right eye see different images, thus the brain will regard the different images seen from two eyes as stereo images.

For shutter glasses, they are widely used for users to view stereo images presented by a video output apparatus. The shutter glasses include two shutter lenses, and allow user's left eye to see left-eye images and user's right eye to see right-eye images by properly switching the shutter lenses between an open state and a close state. However, as a pair of shutter glasses is required to have a controller disposed thereon to control the states of shutter lenses and a battery module disposed thereon to supply power to the controller and the shutter lenses, the cost of shutter glasses is high.

The polarization-based stereo video display technique may be employed due to its lower implementation cost. For example, to display a stereo video on a panel viewed by a user, one polarization-based method is to use a pattern retarder (PR) type or micro retarder type panel. Therefore, an original stereo video stream, including left-eye images and right-eye images, should be converted into a polarized video stream to be properly displayed on the PR type/micro retarder type panel for presenting stereo images to the user. One conventional method is to extract half of scan lines of a left-eye image, extract half of scan lines of a right-eye image, and generate a polarized video frame by combining the extracted scan lines. However, the resolution of the stereo image displayed on the PR type/micro retarder type panel driven by such a polarized video stream is reduced to half of that of the stereo image displayed on a panel driven by the original stereo video stream.

To increase the resolution of the polarized stereo display, a higher temporal frame rate may be employed. That is, the polarized video stream includes more than one frame in an original frame period (e.g., 1/60 second) of left-eye frames and right-eye frames included in the stereo video stream. A conventional method for achieving the higher temporal frame rate is to generate one frame by gathering even scan lines of a pair of left-eye image and right-eye image and generate another frame by gathering odd scan lines of the same pair of left-eye image and right-eye image. However, such a conventional design only has good display quality for frames having motion in a specific direction due to a fixed scan line selection order. Regarding frames having motion in other directions or frames that are still images having no motion, the polarized stereo display with a higher temporal frame rate suffers from the flickering problem and has degraded display quality.

SUMMARY

In accordance with exemplary embodiments of the present invention, an apparatus and method for generating a polarized video stream according to a multi-view video stream (e.g., a stereo/three-dimensional video stream carrying left-eye images and right-eye images) and motion information derived from the multi-view video stream are proposed to solve the problem mentioned above.

According to a first aspect of the present invention, an exemplary video processing apparatus for generating a polarized video stream according to a multi-view video stream is disclosed. The exemplary video processing apparatus includes a motion information detector and a polarization converter. The motion information detector is arranged for detecting motion information of the multi-view video stream by processing the multi-view video stream. The polarization converter is coupled to the motion information detector, and arranged for converting the multi-view video stream into the polarized video stream according to the motion information.

According to a second aspect of the present invention, an exemplary video processing method for generating a polarized video stream according to a multi-view video stream is disclosed. The exemplary video processing method includes the following steps: detecting motion information of the multi-view video stream by processing the multi-view video stream; and converting the multi-view video stream into the polarized video stream according to the motion information.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
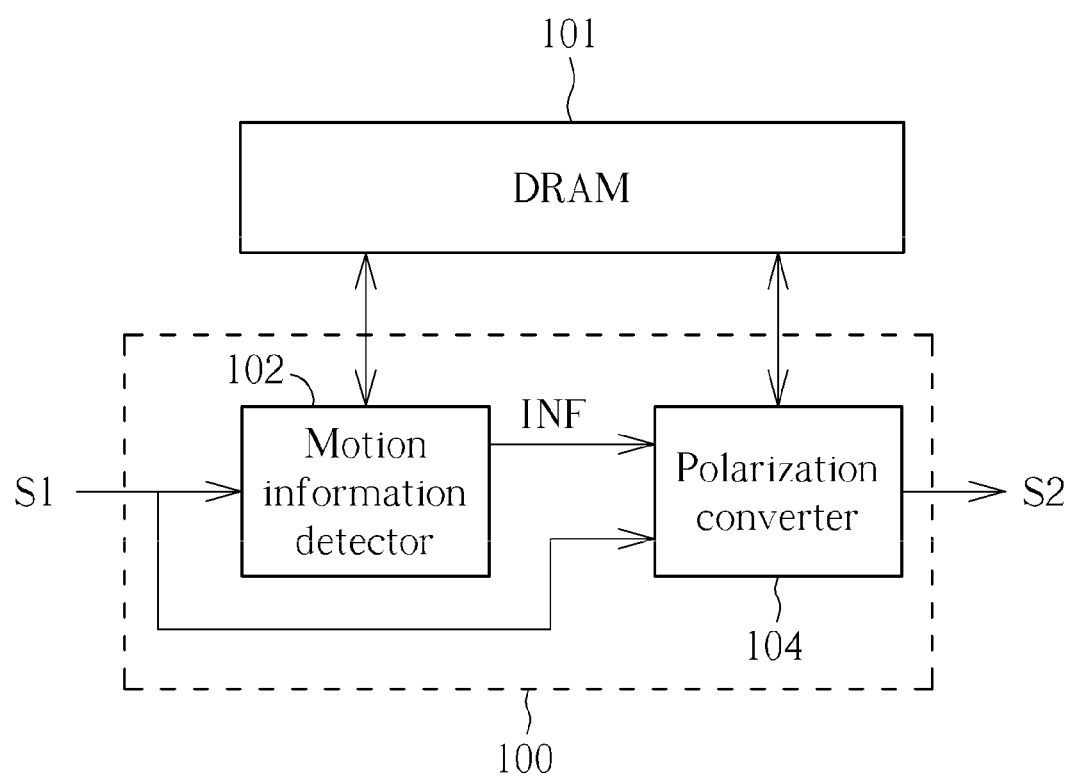
FIG. 1 is a block diagram illustrating a video processing apparatus according to a first exemplary embodiment of the present invention.

Please refer to FIG. 1, which is a block diagram illustrating a video processing apparatus according to a first exemplary embodiment of the present invention. The exemplary video processing apparatus 100 is utilized for generating a polarized video stream S2 according to a multi-view video stream (e.g., a stereo/three-dimensional video stream) S1. The polarized video stream S2 may be supplied to a polarizer type panel used for displaying vertically sub-sampled frames, a barrier type panel used for displaying horizontally sub-sampled frames, or a barrier/lenticular type panel used for displaying vertically and horizontally sub-sampled frames. In this exemplary embodiment, the exemplary video processing apparatus 100 includes, but is not limited to, a motion information detector 102 and a polarization converter 104. Each of the motion information detector 102 and polarization converter 104 may access a storage/buffer device, such as a dynamical random access memory (DRAM) 101, for temporally store data to be processed and the processed data. The motion information detector 102 is arranged for detecting motion information INF of the multi-view video stream S1 by processing the multi-view video stream S1. The polarization converter 104 is coupled to the motion information detector 102, and arranged for converting the multi-view video stream S1 into the polarized video stream S2 according to the motion information INF. As the motion information INF provides a motion status directed to part or all of each original video frame included in the multi-view video stream S1, the polarization converter 104 can refer to the motion information INF to enable proper polarization conversion modes employed for setting the processed video frames included in the polarized video stream S2.

As more than one polarization conversion mode is employed, the display quality for different video frames having no motion and/or having motion in different directions may be enhanced. More specifically, the aforementioned flickering problem encountered by the conventional design may be avoided or mitigated, leading to improved polarized stereo/three-dimensional video display quality. Further details are described hereinafter.

For clarity and simplicity, the polarized video stream S2 in the following exemplary designs is supplied to a polarizer type panel used for displaying vertically sub-sampled frames. Therefore, the processed video frame generated from the polarization conversion operation is based on a combination of odd and even lines (e.g., a combination of pixel rows) extracted from original video frames transmitted by the multi-view video stream S1. However, this is for illustrative purposes only, and is not meant to be a limitation of the present invention. For example, when the polarization converter 104 is used for generating the polarized video stream S2 to a barrier type panel or a barrier/lenticular type panel, the processed video frame generated from the polarization conversion operation is based on the combination of odd and even lines (e.g., a combination of pixel columns, or a combination of pixel rows and pixel columns) extracted from original video frames transmitted by the multi-view video stream S1. In short, the spirit of the present invention is obeyed as long as the motion information derived from the multi-view video stream S1 is referenced for control the polarization conversion used for generating the polarized video stream S2.

In a first exemplary design, the motion information detector 102 is arranged for generating the motion information INF of original video frames of the multi-view video stream S1 by detecting whether the original video frames are still images/pictures. That is, the motion information detector 102 merely checks if there are moving object(s) included in the original video frames, and does not exactly identify the motion directions of the moving objects. Regarding the polarization converter 104, it may be arranged for converting the multi-view video stream S1 into the polarized video stream S2 by utilizing different polarization conversion modes that are respectively set in response to different motion statues indicated by the motion information INF. More specifically, when the motion information INF indicates that the original video frames (e.g., a pair of left-eye image and right-eye image) are still images, the polarization converter 104 converts the original video frames of the multi-view video stream S1 into processed video frames of the polarized video stream S1 under a first polarization conversion mode; and when the motion information INF indicates that the original video frames (e.g., a pair of left-eye image and right-eye image) are not still images, meaning that the original video frames have moving object(s) included therein, the polarization converter 104 converts the original video frames of the multi-view video stream S1 into the processed video frames of the polarized video stream S2 under a second polarization conversion mode. It should be noted that the polarization converter 104 performs different polarization conversions when operating under different polarization conversion modes. Examples of different polarization conversions performed by the polarization converter 104 are illustrated as below.

Figure 2:
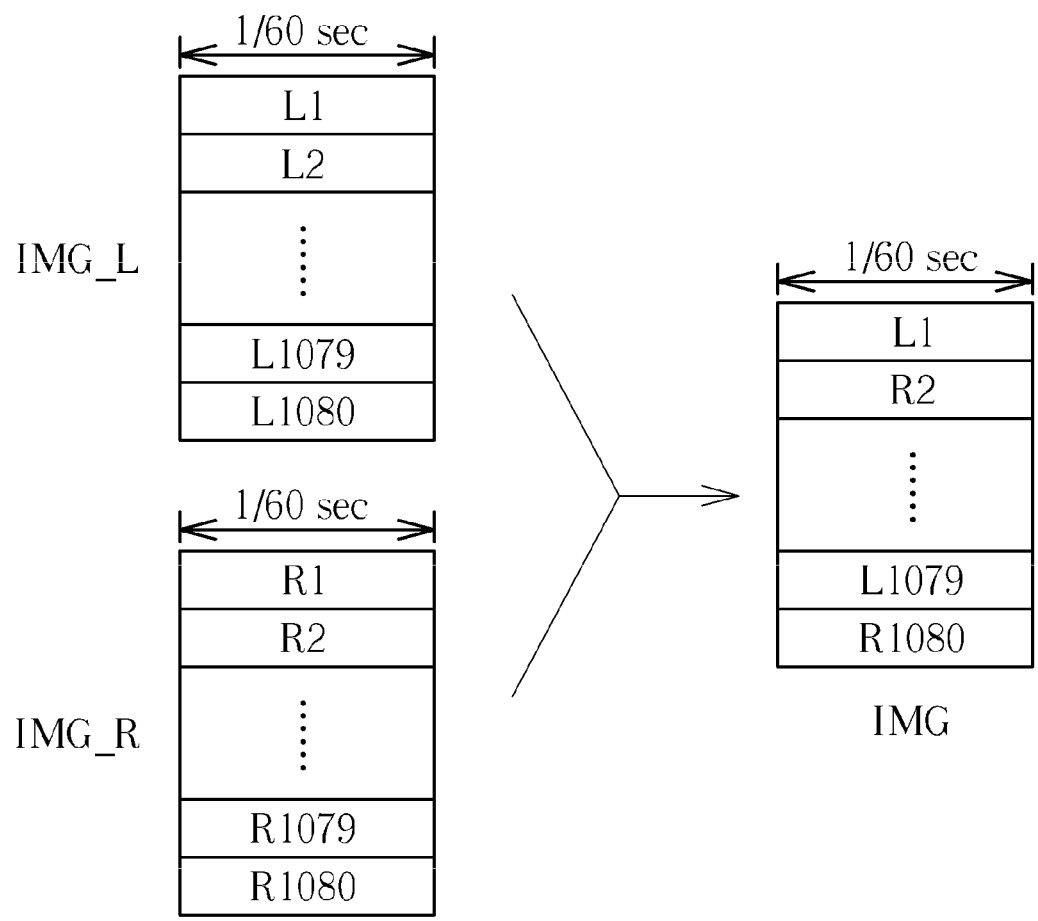
FIG. 2 is a diagram illustrating a processed video frame generated under one polarization conversion mode when the motion information indicates that the left-eye image and right-eye image are still images.

FIG. 2 is a diagram illustrating a processed video frame IMG generated under one polarization conversion mode when the motion information INF indicates that the left-eye image IMG_L and the right-eye image IMG_R are still images. When the motion information INF indicates that the original video frames (e.g., the left-eye image IMG_L having scan lines L1, L2, . . . , L1079, and L1080 included therein, and the right-eye image IMG_R having scan lines R1, R2, . . . , R1079, and R1080 included therein) are still images, the polarization converter 104 would employ the exemplary polarization conversion shown in FIG. 2 to generate a processed video frame of the polarized video stream S2. By way of example, the conventional polarization conversion method is employed to extract half of scan lines (e.g., odd scan lines) of the left-eye image IMG_L, extract half of scan lines (e.g., even scan lines) of the right-eye image IMG_R, and generate the processed video frame IMG by combining the extracted scan lines. It should be noted that the frame rate of the processed video frames generated from the polarization converter 104 under this polarization conversion mode is equal to the frame rate of the left-eye images and the right-eye images transmitted via the multi-view video stream S1. As no higher temporal frame rate is used to increase the resolution of the polarized stereo display, the aforementioned flickering problem is avoided. In other words, the processed video frames having no motion would have good display quality when displayed on the polarizer type panel.

It should be noted that the number of scan lines included in the left-eye image IMG_L/right-eye image IMG_R is for illustrative purposes only, and is not meant to be a limitation of the present invention.

Figure 3:
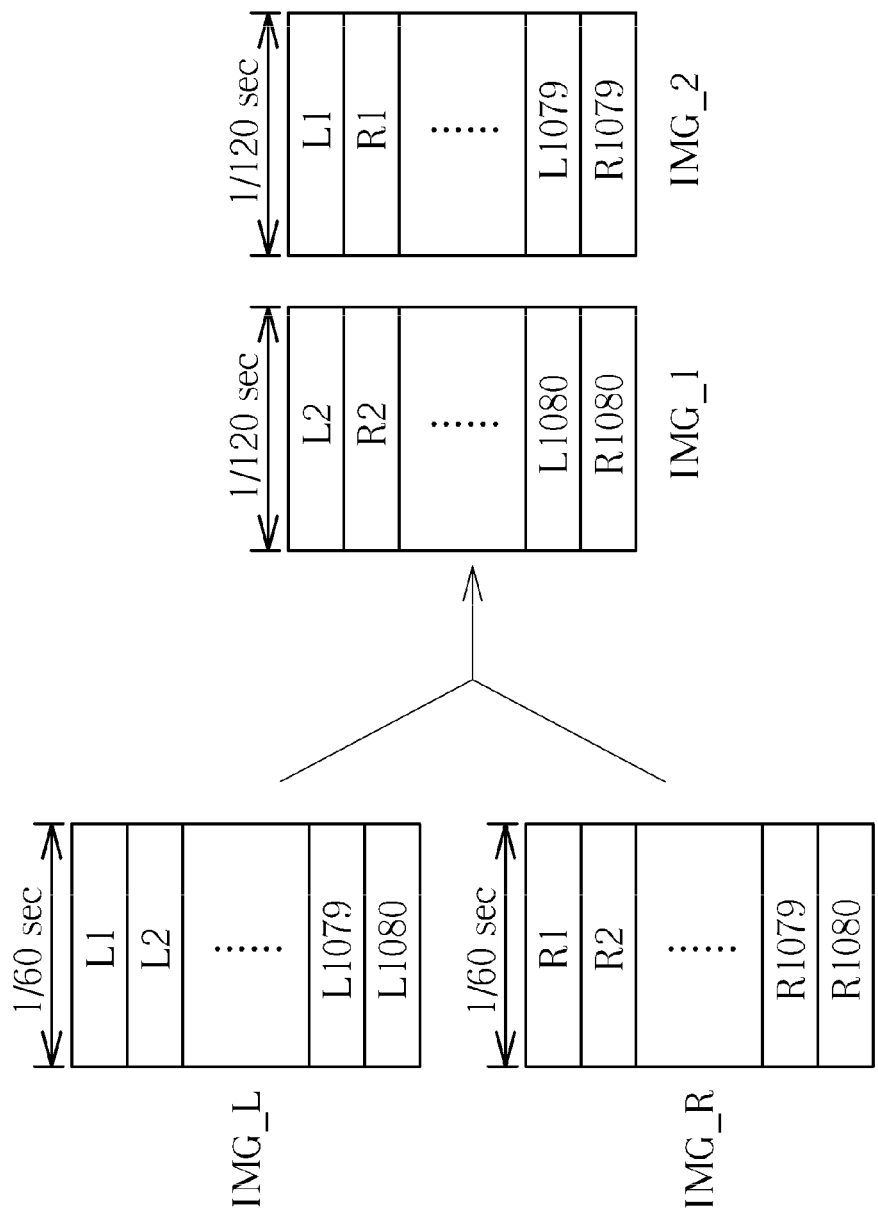
FIG. 3 is a diagram illustrating processed video frames generated under another polarization conversion mode when the motion information indicates that the left-eye image and right-eye image are not still images.
Figure 4:
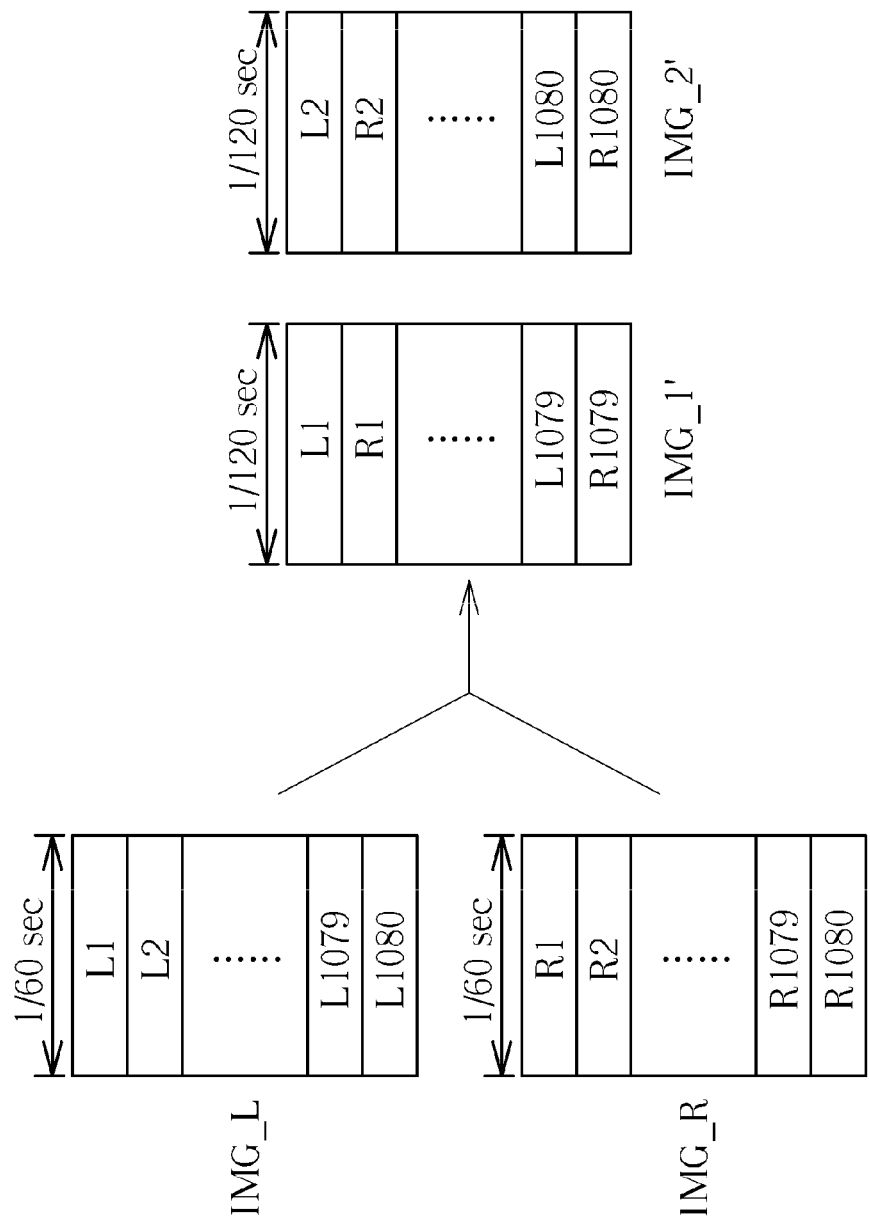
FIG. 4 is a diagram illustrating processed video frames generated under yet another polarization conversion mode when the motion information indicates that the left-eye image and right-eye image are not still images.

FIG. 3 is a diagram illustrating processed video frames IMG_1 and IMG_2 generated under another polarization conversion mode when the motion information INF indicates that the left-eye image IMG_L and right-eye image IMG_R are not still images. FIG. 4 is a diagram illustrating processed video frames IMG_1' and IMG_2' generated under yet another polarization conversion mode when the motion information INF indicates that the left-eye image IMG_L and right-eye image IMG_R are not still images. When the motion information INF indicates that the original video frames (e.g., the left-eye image IMG_L and the right-eye image IMG_R) are not still images, the polarization converter 104 would employ an exemplary polarization conversion shown in either FIG. 3 or FIG. 4 to generate the processed video frames IMG_1 and IMG_2/IMG_1' and IMG_2' of the polarized video stream S2. As shown in either of FIG. 3 and FIG. 4, the processed video frames generated from the polarization converter 104 have a higher temporal frame rate when compared to the frame rate of the left-eye images and right-eye images included in the multi-view video stream S1. Regarding the polarization conversion shown in FIG. 3, one processed video frame IMG_1 is first generated by gathering even scan lines of left-eye image IMG_L and right-eye image IMG_R, and then another processed video frame IMG_2 is generated by gathering odd scan lines of the same left-eye image IMG_L and right-eye image IMG_R. Regarding the polarization conversion shown in FIG. 4, one processed video frame IMG_1' is first generated by gathering odd scan lines of left-eye image IMG_L and right-eye image IMG_R, and then another processed video frame IMG_2' is generated by gathering even scan lines of the same left-eye image IMG_L and right-eye image IMG_R. Since the processed video frames are not still images and thus have moving object(s) included therein, displaying the processed video frames with a higher frame rate would result in an increased resolution, and would have display quality better than that of displaying the processed video frames with a lower frame rate.

More specifically, based on observation of experimental results, the polarization converter 104 employing the polarization conversion shown in FIG. 2 would operate under a polarization conversion mode with best display quality for video frames that are still images; the polarization converter 104 employing the polarization conversion shown in FIG. 3 would operate under a polarization conversion mode with best display quality for video frames that have motion in a downward direction; and the polarization converter 104 employing the polarization conversion shown in FIG. 4 would operate under a polarization conversion mode with best display quality for video frames that have motion in an upward direction. A second exemplary design is therefore developed according to such an observation. In the second exemplary design, the motion information detector 102 is arranged for generating motion information INF of original video frames of the multi-view video stream S1 by detecting global motion of the original video frames. That is, when an original video frame of the multi-view video stream S1 is not a still image, the motion information detector 102 is capable of identifying a direction of the global motion corresponding to all moving objects included in the original video frame. For example, when an original video frame of the multi-view video stream S1 is not a still image, the motion information detector 102 may detect the accumulated motion in a vertical direction (i.e., global motion in the vertical direction) to determine that the original video frame has the global motion being either upward motion or downward motion.

When the motion information INF indicates that the original video frames (e.g., the left-eye image IMG_L and right-eye image IMG_R) are still images, the polarization converter 104 is arranged for converting the original video frames into processed video frames of the polarized video stream S2 under a first polarization conversion mode (e.g., the exemplary polarization conversion shown in FIG. 2 is employed). When the motion information INF indicates that the original video frames (e.g., the left-eye image IMG_L and right-eye image IMG_R) have global motion in a first direction (e.g., a downward direction), the polarization converter 104 converts the original video frames into the processed video frames under a second polarization conversion mode (e.g., the exemplary polarization conversion shown in FIG. 3 is employed). When the motion information INF indicates that the original video frames (e.g., the left-eye image IMG_L and right-eye image IMG_R) have global motion in a second direction (e.g., an upward direction), the polarization converter 104 converts the original video frames into the processed video frames under a third polarization conversion mode (e.g., the exemplary polarization conversion shown in FIG. 4 is employed). In a case where none of the above-mentioned conditions is met, the polarization converter 104 may be configured to keep using the previously employed polarization conversion. That is, the polarization conversion mode in which the polarization converter 104 currently operates remains unchanged.

Regarding processed video frames that are still images, no higher temporal frame rate is used to increase the resolution. Thus, the aforementioned flickering problem is easily avoided. To put it simply, regarding the polarized stereo display, the video frames having no motion would have optimized display quality. Regarding video frames with global motion in an upward direction or a downward direction, the polarization conversion mode is adaptively selected according to the global motion direction. Therefore, as the use of the polarization conversion shown in FIG. 3 is capable of avoiding/mitigating flickering of video frames with downward motion due to selecting the even scan lines first and then odd scan lines, the display quality is enhanced correspondingly. Similarly, as the use of the polarization conversion shown in FIG. 4 is capable of avoiding/mitigating flickering of video frames with upward motion due to selecting the odd scan lines first and then the even scan lines, the display quality is enhanced correspondingly.

In above exemplary designs, the polarization conversion is performed at a frame level. However, this is not meant to be a limitation of the present invention. For example, in a third exemplary design, the polarization conversion is allowed to be performed at a block/pixel level. In practice, the polarization conversion may be performed at a frame level or a block/pixel level, depending upon the employed motion information detection scheme.

In the third exemplary design, the motion information detector 102 is arranged for generating motion information INF of original video frames of the multi-view video stream S1 by detecting motion vectors of the original video frames. That is, the motion information detector 102 is capable of determining motion of part of an original video frame of the multi-view input S1, wherein part of the original video frame may be a pixel or a block including a plurality of pixels. Regarding the polarization converter 104, it is arranged for determining a plurality of weighting factors according to motion information derived from processing part of the original video frame of the multi-view input S1, generating a plurality of candidate contents of part of a processed video frame of the polarized video stream S2 under a plurality of different polarization conversion modes, and outputting an actual content of part of the processed video frame by blending the candidate contents according to the weighting factors. The block/pixel based polarization conversion is illustrated as below.

Figure 5:
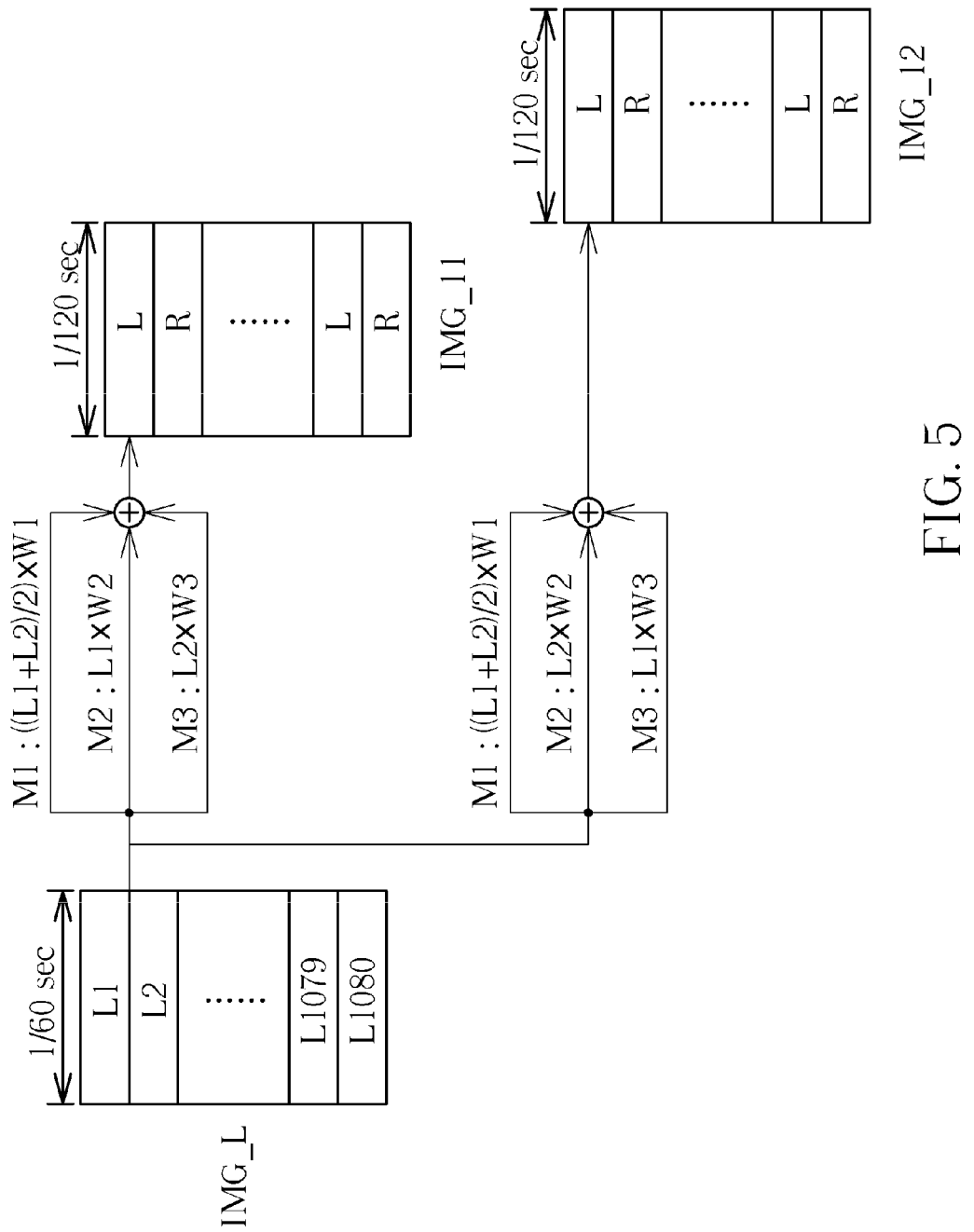
FIG. 5 is a diagram illustrating an exemplary polarization conversion configured to blend candidate contents according to respective weighting factors.

Please refer to FIG. 5, which is a diagram illustrating an exemplary polarization conversion configured to blend candidate contents according to respective weighting factors. In this exemplary embodiment, there are different polarization conversion modes, including a first polarization conversion mode M1, a second polarization conversion mode M2, and a third polarization conversion mode M3. The motion information INF indicates the motion status of the scan lines L1 and L2 of the original video frame (e.g., the left-eye image IMG_L). When the motion information ING indicates that the scan lines L1 and L2 correspond to a still image, the weighting factor W1 corresponding to the first polarization conversion mode M1 is configured to be greater than weighting factors W2 and W3 respectively corresponding to the second and third polarization conversion modes M2 and M3. When the motion information INF indicates that the scan lines L1 and L2 have motion in a first direction (e.g., an upward direction) greater than motion in a second direction (e.g., a downward direction), the weighting factor W2 is configured to be greater than weighting factors W1 and W3. When the motion information INF indicates that the scan lines L1 and L2 have motion in the second direction (e.g., the downward direction) greater than motion in the first direction (e.g., the upward direction), the weighting factor W3 is configured to be greater than weighting factors W1 and W2.

Moreover, when operating under the first polarization conversion mode M1, the polarization converter 104 is arranged to generate a candidate content by outputting average values each derived from pixel values of pixels located at adjacent lines including an odd scan line (e.g., L1) and an even scan line (e.g., L2); when operating under the second polarization conversion mode M2, the polarization converter 104 is arranged to generate another candidate content by outputting pixel values of pixels located at the odd scan line (e.g., L1) prior to outputting pixel values of pixels located at the even scan line (e.g., L2); and when operating under the third polarization conversion mode M3, the polarization converter 104 is arranged to generate yet another candidate content by outputting the pixel values of the pixels located at the even scan line (e.g., L2) prior to outputting the pixel values of the pixels located at the odd scan line (e.g., L1).

As the weighting factors W1-W3 are configured according to the actual motion status of the scan lines L1 and L2 to be processed, the display of the processed video frames IMG_11 and IMG_12 with a higher temporal frame rate has enhanced quality due to increased resolution and mitigated flickering effect.

As shown in FIG. 1, the motion information detector 102 may be a hardware element dedicated to the polarization converter 104. However, this is for illustrative purposes only, and is not meant to be a limitation of the present invention. For example, a hardware sharing technique may be employed to reduce the hardware cost. Some alternative designs are shown in FIGS. 6-8.

Figure 6:
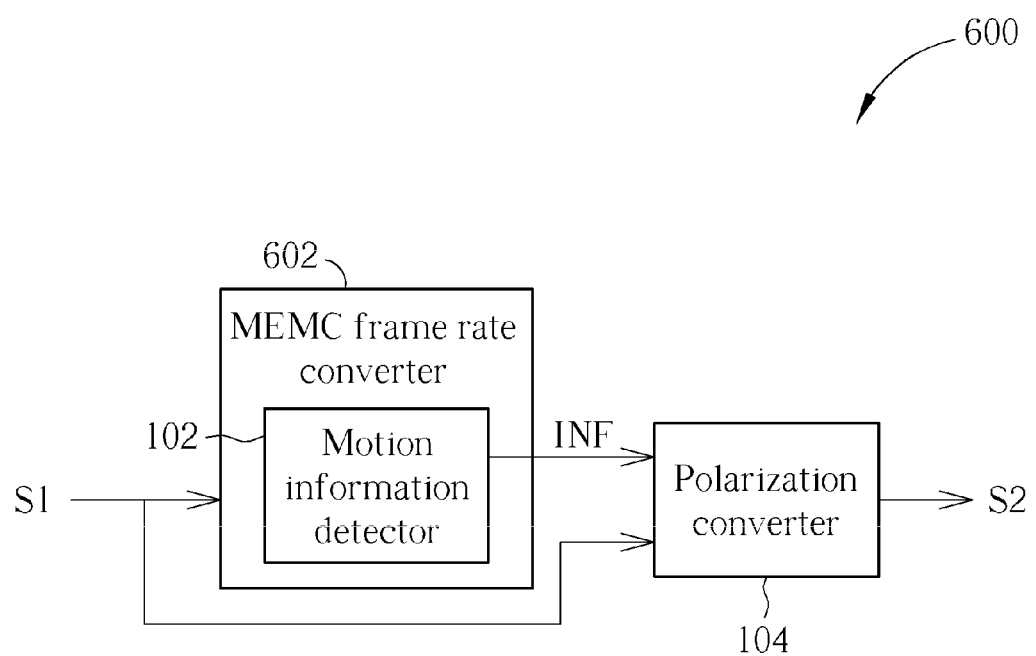
FIG. 6 is a block diagram illustrating a video processing apparatus according to a second exemplary embodiment of the present invention.

FIG. 6 is a block diagram illustrating a video processing apparatus according to a second exemplary embodiment of the present invention. As can be seen from this figure, the motion information detector 102 is integrated within a motion estimation motion compensation (MEMC) frame rate converter 602. That is, the motion information detector 102 of the video processing apparatus 600 is part of the MEMC frame rate converter 602, and shared with the polarization converter 104 for providing the desired motion information INF to the polarization converter 104.

Figure 7:
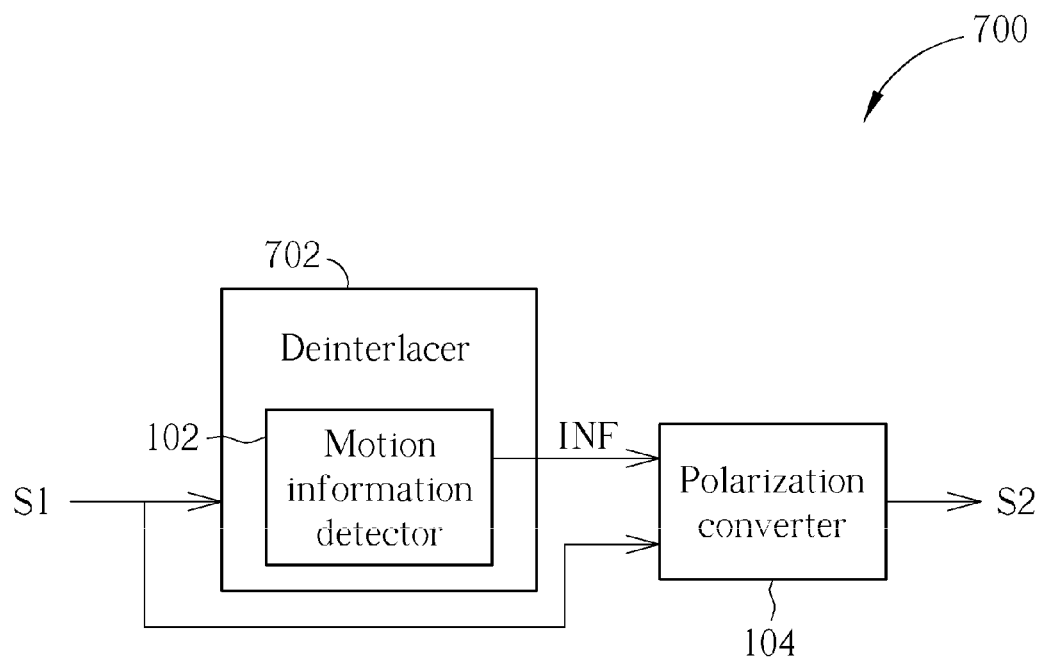
FIG. 7 is a block diagram illustrating a video processing apparatus according to a third exemplary embodiment of the present invention.

FIG. 7 is a block diagram illustrating a video processing apparatus according to a third exemplary embodiment of the present invention. As can be seen from this figure, the motion information detector 102 is integrated within a deinterlacer 702. That is, the motion information detector 102 of the video processing apparatus 700 is part of the deinterlacer 702, and shared with the polarization converter 104 for providing the desired motion information INF to the polarization converter 104.

Figure 8:
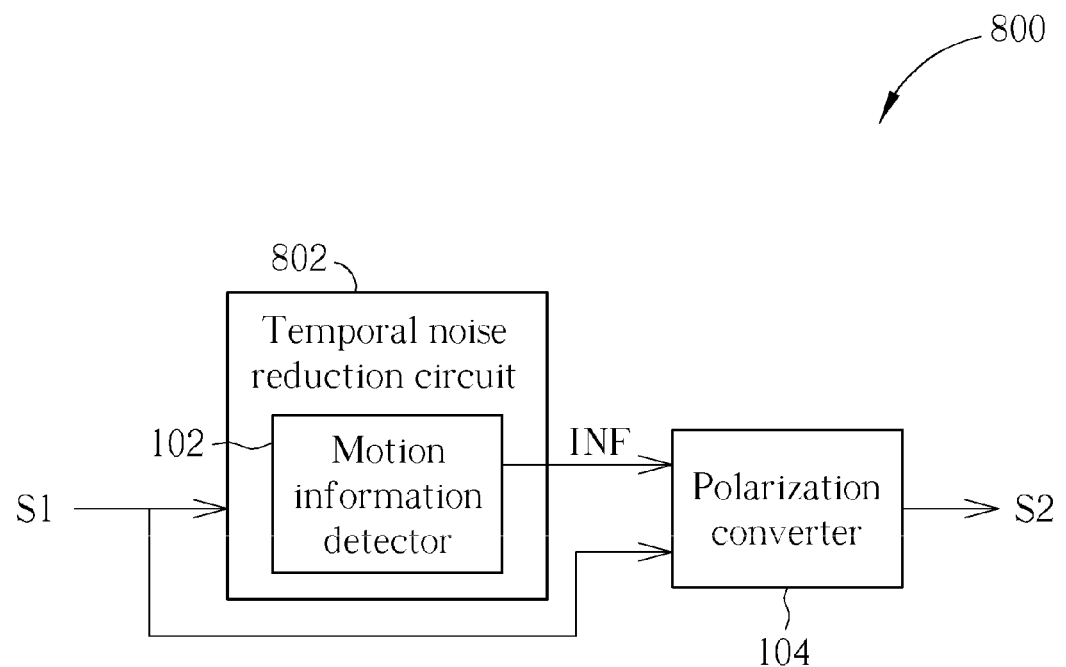
FIG. 8 is a block diagram illustrating a video processing apparatus according to a fourth exemplary embodiment of the present invention.

FIG. 8 is a block diagram illustrating a video processing apparatus according to a fourth exemplary embodiment of the present invention. As can be seen from this figure, the motion information detector 102 is integrated within a temporal noise reduction circuit 802. That is, the motion information detector 102 of the video processing apparatus 800 is part of the temporal noise reduction circuit 802, and shared with the polarization converter 104 for providing the desired motion information INF to the polarization converter 104.

Figure 9:
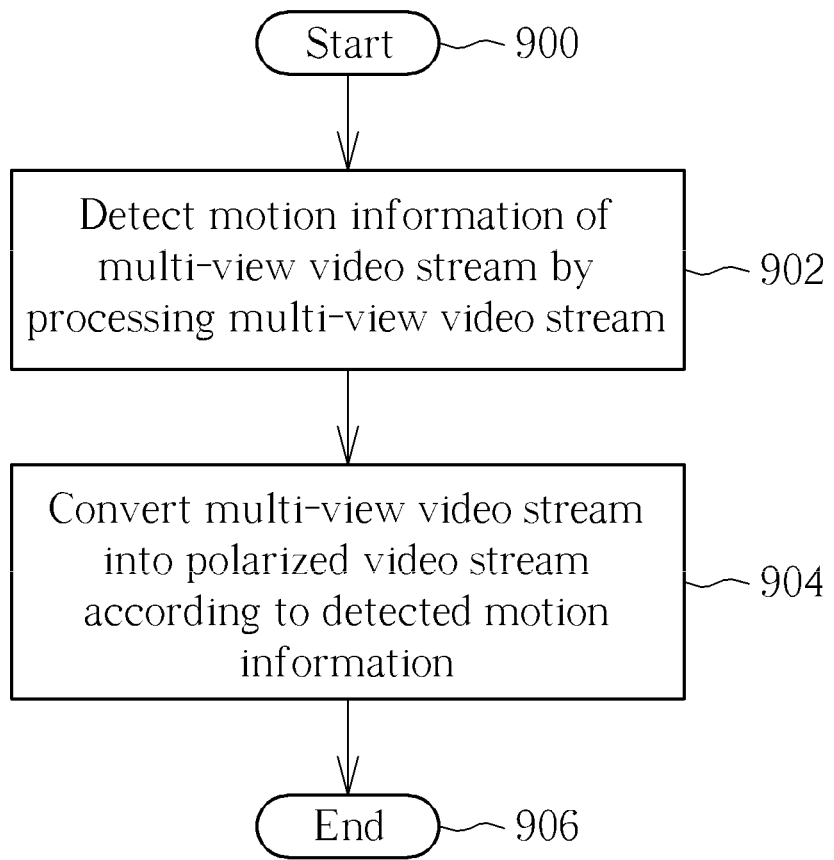
FIG. 9 is a flowchart illustrating an exemplary video processing method according to an exemplary embodiment of the present invention.

FIG. 9 is a flowchart illustrating an exemplary video processing method for generating a polarized video stream according to a multi-view video stream. The video processing method may be employed by one of the above-mentioned video processing apparatuses 100, 600, 700, and 800, and may be briefly summarized as below.

Step 900: Start.

Step 902: Detect motion information of a multi-view video stream by processing the multi-view video stream.

Step 904: Convert the multi-view video stream into a polarized video stream according to the detected motion information. The polarization conversion may be performed at a frame level or a block/pixel level, depending upon the employed motion information detection scheme.

Step 906: End.

Step 902 may be executed by a hardware element such as the motion information detector 102, and step 904 may be executed by another hardware element such as the polarization converter 104. As a person skilled in the art can readily understand details of each step after reading above paragraphs directed to the exemplary video processing apparatus, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing apparatus for generating a polarized video stream according to a multi-view video stream, comprising:

a motion information detector, arranged for detecting motion information of the multi-view video stream by processing the multi-view video stream; and a polarization converter, coupled to the motion information detector and arranged for converting the multi-view video stream into the polarized video stream according to the motion information; wherein when motion information of original video frames of the multi-view video stream indicates that the original video frames are still images, the polarization converter is arranged for converting the original video frames into processed video frames of the polarized video stream under a first polarization conversion mode; and when the motion information of the original video frames indicates that the original video frames are not still images, the polarization converter is arranged for converting the original video frames into the processed video frames under another polarization conversion mode.

2. The video processing apparatus of claim 1, wherein the motion information detector is arranged for generating motion information of original video frames of the multi-view video stream by:
   detecting whether the original video frames are still images;
   detecting global motion of the original video frames; or
   detecting motion vectors of the original video frames.

3. The video processing apparatus of claim 1, wherein the motion information detector is integrated within a motion estimation motion compensation (MEMC) frame rate converter, a deinterlacer, or a temporal noise reduction circuit.

4. The video processing apparatus of claim 1, wherein the polarization converter is arranged for converting the multi-view video stream into the polarized video stream by utilizing different polarization conversion modes respectively set in response to different motion statues indicated by the motion information.

5. The video processing apparatus of claim 1, wherein a frame rate of processed frames generated under a second polarization conversion mode is higher than a frame rate of processed frames generated under the first polarization conversion mode.

6. The video processing apparatus of claim 1, wherein when the motion information of the original video frames indicates that the original video frames have global motion in a first direction, the polarization converter is arranged for converting the original video frames into the processed video frames under a second polarization conversion mode; and when the motion information of the original video frames indicates that the original video frames have global motion in a second direction, the polarization converter is arranged for converting the original video frames into the processed video frames under a third polarization conversion mode.

7. The video processing apparatus of claim 6, wherein a second frame rate of processed frames generated under the second polarization conversion mode is higher than a first frame rate of processed frames generated under the first polarization conversion mode; and a third frame rate of processed frames generated under the third polarization conversion mode is higher than the first frame rate of processed frames generated under the first polarization conversion mode.

8. The video processing apparatus of claim 7, wherein the third frame rate is equal to the second frame rate; the original video frames includes a first video frame of a first view and a second frame of a second view; when operating under the second polarization conversion mode, the polarization converter is arranged for generating a first processed video frame by gathering odd lines of the first video frame and the second video frame, and then generating a second processed video frame by gathering even lines of the first video frame and the second video frame; and when operating under the third polarization conversion mode, the polarization converter is arranged for generating the first processed video frame by gathering even lines of the first video frame and the second video frame, and then generating the second processed video frame by gathering odd lines of the first video frame and the second video frame.

9. The video processing apparatus of claim 1, wherein the polarization converter is arranged for determining a plurality of weighting factors according to motion information of part of an original video frame of the multi-view input, generating a plurality of candidate contents of part of a processed video frame of the polarized video stream under a plurality of different polarization conversion modes, and outputting an actual content of the part of the processed video frame by blending the candidate contents according to the weighting factors.

10. The video processing apparatus of claim 9, wherein the different polarization conversion modes includes the first polarization conversion mode, a second polarization conversion mode, and a third polarization conversion mode; when the motion information of the part of the original video frame indicates that the part of the original video frame is a still image, a weighting factor corresponding to the first polarization conversion mode is configured to be greater than weighting factors respectively corresponding to the second and third polarization conversion modes; when the motion information of the part of the original video frame indicates that the part of the original video frame has motion in a first direction greater than motion in a second direction, a weighting factor corresponding to the second polarization conversion mode is configured to be greater than weighting factors respectively corresponding to the first and third polarization conversion modes; when the motion information of the part of the original video frame indicates that the part of the original video frame has motion in the second direction greater than motion in the first direction, a weighting factor corresponding to the third polarization conversion mode is configured to be greater than weighting factors respectively corresponding to the first and second polarization conversion modes.

11. The video processing apparatus of claim 10, wherein when operating under the first polarization conversion mode, the polarization converter is arranged to generate a candidate content by outputting average values each derived from pixel values of pixels located at adjacent lines including an odd line and an even line; when operating under the second polarization conversion mode, the polarization converter is arranged to generate another candidate content by outputting pixel values of pixels located at the odd line prior to outputting pixel values of pixels located at the even line; and when operating under the third polarization conversion mode, the polarization converter is arranged to generate yet another candidate content by outputting the pixel values of the pixels located at the even line prior to outputting the pixel values of the pixels located at the odd line.

12. A video processing method for generating a polarized video stream according to a multi-view video stream, comprising:
   detecting motion information of the multi-view video stream by processing the multi-view video stream; and
   converting the multi-view video stream into the polarized video stream according to the motion information;
   wherein when motion information of original video frames of the multi-view video stream indicates that the original video frames are still images, converting the original video frames into processed video frames of the polarized video stream under a first polarization conversion mode; and when the motion information of the original video frames indicates that the original video frames are not still images, converting the original video frames into the processed video frames under another polarization conversion mode.

13. The video processing method of claim 12, wherein the step of detecting the motion information of the multi-view video stream comprises:

generating motion information of original video frames of the multi-view video stream by detecting whether the original video frames are still images, by detecting global motion of the original video frames, or by detecting motion vectors of the original video frames.

14. The video processing method of claim 12, wherein the step of detecting the motion information of the multi-view video stream comprises:
performing a motion estimation motion compensation (MEMC) frame rate conversion, a deinterlacing operation, or a temporal noise reduction to detect the motion information of the multi-view video stream.

15. The video processing method of claim 12, wherein the step of converting the multi-view video stream into the polarized video stream comprises:
converting the multi-view video stream into the polarized video stream under by utilizing different polarization conversion modes respectively set in response to different motion statues indicated by the motion information.

16. The video processing method of claim 12, wherein a frame rate of processed frames generated under a second polarization conversion mode is higher than a frame rate of processed frames generated under the first polarization conversion mode.

17. The video processing method of claim 12, wherein the step of converting the multi-view video stream into the polarized video stream under by utilizing the different polarization conversion modes comprises:
when the motion information of the original video frames indicates that the original video frames have global motion in a first direction, converting the original video frames into the processed video frames under a second polarization conversion mode; and
when the motion information of the original video frames indicates that the original video frames have global motion in a second direction, converting the original video frames into the processed video frames under a third polarization conversion mode.

18. The video processing method of claim 17, wherein a second frame rate of processed frames generated under the second polarization conversion mode is higher than a first frame rate of processed frames generated under the first polarization conversion mode; and a third frame rate of processed frames generated under the third polarization conversion mode is higher than the first frame rate of processed frames generated under the first polarization conversion mode.

19. The video processing method of claim 18, wherein the third frame rate is equal to the second frame rate; the original video frames includes a first video frame of a first view and a second frame of a second view; under the second polarization conversion mode, a first processed video frame is generated by gathering odd lines of the first video frame and the second video frame, and then a second processed video frame is generated by gathering even lines of the first video frame and the second video frame; and under the third polarization conversion mode, the first processed video frame is generated by gathering even lines of the first video frame and the second video frame, and then the second processed video frame is generated by gathering odd lines of the first video frame and the second video frame.

20. The video processing method of claim 12, wherein the step of converting the multi-view video stream into the polarized video stream comprises:
determining a plurality of weighting factors according to motion information of part of an original video frame of the multi-view input;
generating a plurality of candidate contents of part of a processed video frame of the polarized video stream under a plurality of different polarization conversion modes; and
outputting an actual content of the part of the processed video frame by blending the candidate contents according to the weighting factors.

21. The video processing method of claim 20, wherein the different polarization conversion modes includes the first polarization conversion mode, a second polarization conversion mode, and a third polarization conversion mode; when the motion information of the part of the original video frame indicates that the part of the original video frame is a still image, a weighting factor corresponding to the first polarization conversion mode is configured to be greater than weighting factors respectively corresponding to the second and third polarization conversion modes; when the motion information of the part of the original video frame indicates that the part of the original video frame has motion in a first direction greater than motion in a second direction, a weighting factor corresponding to the second polarization conversion mode is configured to be greater than weighting factors respectively corresponding to the first and third polarization conversion modes; when the motion information of the part of the original video frame indicates that the part of the original video frame has motion in the second direction greater than motion in the first direction, a weighting factor corresponding to the third polarization conversion mode is configured to be greater than weighting factors respectively corresponding to the first and second polarization conversion modes.

22. The video processing method of claim 21, wherein the step of generating the candidate contents comprises:
under the first polarization conversion mode, generating a candidate content by outputting average values each derived from pixel values of pixels located at adjacent lines including an odd line and an even line;
under the second polarization conversion mode, generating another candidate content by outputting pixel values of pixels located at the odd line prior to outputting pixel values of pixels located at the even line; and
under the third polarization conversion mode, generating yet another candidate content by outputting the pixel values of the pixels located at the even line prior to outputting the pixel values of the pixels located at the odd line.

23. A video processing apparatus for generating a polarized video stream according to a multi-view video stream, comprising:
a motion information detector, arranged for detecting motion information of the multi-view video stream by processing the multi-view video stream; and
a polarization converter, coupled to the motion information detector and arranged for converting the multi-view video stream into the polarized video stream according to the motion information, wherein when the motion information of the original video frames indicates that the original video frames have global motion in a first direction, the polarization converter is arranged for converting the original video frames into the processed video frames under a first polarization conversion mode; and when the motion information of the original video frames indicates that the original video frames have global motion in a second direction, the polarization converter is arranged for converting the original video frames into the processed video frames under a second polarization conversion mode.

24. The video processing apparatus of claim 23, wherein the polarization converter is arranged for determining a plurality of weighting factors according to motion information of part of an original video frame of the multi-view input, generating a plurality of candidate contents of part of a processed video frame of the polarized video stream under a plurality of different polarization conversion modes, and outputting an actual content of the part of the processed video frame by blending the candidate contents according to the weighting factors.

25. The video processing apparatus of claim 24, wherein the different polarization conversion modes includes the first polarization conversion mode, the second polarization conversion mode, and a third polarization conversion mode; when the motion information of the part of the original video frame indicates that the part of the original video frame is a still image, a weighting factor corresponding to the third polarization conversion mode is configured to be greater than weighting factors respectively corresponding to the first and second polarization conversion modes; when the motion information of the part of the original video frame indicates that the part of the original video frame has motion in a first direction greater than motion in a second direction, a weighting factor corresponding to the first polarization conversion mode is configured to be greater than weighting factors respectively corresponding to the second and third polarization conversion modes; when the motion information of the part of the original video frame indicates that the part of the original video frame has motion in the second direction greater than motion in the first direction, a weighting factor corresponding to the second polarization conversion mode is configured to be greater than weighting factors respectively corresponding to the first and third polarization conversion modes.

26. The video processing apparatus of claim 25, wherein when operating under the first polarization conversion mode, the polarization converter is arranged to generate a candidate content by outputting pixel values of pixels located at the odd line prior to outputting pixel values of pixels located at the even line; when operating under the second polarization conversion mode, the polarization converter is arranged to generate another candidate content by outputting the pixel values of the pixels located at the even line prior to outputting the pixel values of the pixels located at the odd line; and when operating under the third polarization conversion mode, the polarization converter is arranged to generate yet another candidate content by outputting average values each derived from pixel values of pixels located at adjacent lines including an odd line and an even line.

27. A video processing method for generating a polarized video stream according to a multi-view video stream, comprising:
detecting motion information of the multi-view video stream by processing the multi-view-video stream; and
converting the multi-view video stream into the polarized video stream according to the motion information, wherein when the motion information of the original video frames indicates that the original video frames have global motion in a first direction, converting the original video frames into the processed video frames under a first polarization conversion mode; and when the motion information of the original video frames indicates that the original video frames have global motion in a second direction, converting the original video frames into the processed video frames under a second polarization conversion mode.

28. The video processing method of claim 27, wherein the step of converting the multi-view video stream into the polarized video stream comprises:
determining a plurality of weighting factors according to motion information of part of an original video frame of the multi-view input;
generating a plurality of candidate contents of part of a processed video frame of the polarized video stream under a plurality of different polarization conversion modes; and
outputting an actual content of the part of the processed video frame by blending the candidate contents according to the weighting factors.

29. The video processing method of claim 28, wherein the different polarization conversion modes includes the first polarization conversion mode, the second polarization conversion mode, and a third polarization conversion mode; when the motion information of the part of the original video frame indicates that the part of the original video frame is a still image, a weighting factor corresponding to the third polarization conversion mode is configured to be greater than weighting factors respectively corresponding to the first and second polarization conversion modes; when the motion information of the part of the original video frame indicates that the part of the original video frame has motion in a first direction greater than motion in a second direction, a weighting factor corresponding to the first polarization conversion mode is configured to be greater than weighting factors respectively corresponding to the second and third polarization conversion modes; when the motion information of the part of the original video frame indicates that the part of the original video frame has motion in the second direction greater than motion in the first direction, a weighting factor corresponding to the second polarization conversion mode is configured to be greater than weighting factors respectively corresponding to the first and third polarization conversion modes.

30. The video processing method of claim 29, wherein the step of generating the candidate contents comprises:
under the first polarization conversion mode, generating a candidate content by outputting pixel values of pixels located at the odd line prior to outputting pixel values of pixels located at the even line;
under the second polarization conversion mode, generating another candidate content by outputting the pixel values of the pixels located at the even line prior to outputting the pixel values of the pixels located at the odd line; and
under the third polarization conversion mode, generating yet another candidate content by outputting average values each derived from pixel values of pixels located at adjacent lines including an odd line and an even line.

* * * * *